United States Patent
Winblad

(10) Patent No.: US 11,237,820 B2
(45) Date of Patent: Feb. 1, 2022

(54) DELTA FILE WITH REVERSING DATA

(71) Applicant: Nordic Semiconductor ASA, Trondheim (NO)

(72) Inventor: Marko Winblad, Trondheim (NO)

(73) Assignee: Nordic Semiconductor ASA, Trondheim (NO)

(*) Notice: Subject to any disclaimer, the term of this patent is extended or adjusted under 35 U.S.C. 154(b) by 0 days.

(21) Appl. No.: 17/059,177

(22) PCT Filed: May 28, 2019

(86) PCT No.: PCT/EP2019/063882
§ 371 (c)(1),
(2) Date: Nov. 25, 2020

(87) PCT Pub. No.: WO2019/229091
PCT Pub. Date: Dec. 5, 2019

(65) Prior Publication Data
US 2021/0232381 A1    Jul. 29, 2021

(30) Foreign Application Priority Data

May 29, 2018 (GB) ..................... 1808737
May 29, 2018 (GB) ..................... 1808739

(51) Int. Cl.
*G06F 8/65* (2018.01)
*G06F 16/23* (2019.01)
(Continued)

(52) U.S. Cl.
CPC .............. *G06F 8/65* (2013.01); *G06F 9/4403* (2013.01); *G06F 16/2379* (2019.01); *G06F 8/658* (2018.02)

(58) Field of Classification Search
CPC ....................................................... G06F 8/65
See application file for complete search history.

(56) References Cited

U.S. PATENT DOCUMENTS

2007/0300205 A1* 12/2007 Scian ................ G06F 8/65
717/106
2009/0327266 A1* 12/2009 Tankovich .......... G06F 16/3331
(Continued)

FOREIGN PATENT DOCUMENTS

EP      1 686 463 A1    8/2006
EP      1 769 343 A2    4/2007
WO      WO 2015/092355 A1    6/2015

OTHER PUBLICATIONS

International Search Report and Written Opinion for PCT/EP2019/063882, dated Aug. 1, 2019, 14 pages.
(Continued)

*Primary Examiner* — Jae U Jeon
(74) *Attorney, Agent, or Firm* — Klarquist Sparkman, LLP

(57) ABSTRACT

A processing system is configured to process instructions in a delta file, received at an input of the processing system, to generate a target file from a source file and to regenerate the source file from the target file. The delta file comprises copy instructions and reversing data. The copy instructions instruct the processing system to include one or more copy strings from the source file in the target file. The reversing data is received as part of the delta file and is used to regenerate all of the source file that is outside the one or more copy strings. The processing system is configured to generate the target file from the source file by reading the copy strings from the source file and including them in the target file. The processing system is further configured to regenerate the source file from the target file by reading the copy strings from the target file and including them in the regenerated source file and using the reversing data to include, in the regenerated source file, all of the source file that is outside the one or more copy strings.

20 Claims, 3 Drawing Sheets

(51) Int. Cl.
   *G06F 9/4401*   (2018.01)
   *G06F 8/658*    (2018.01)

(56) References Cited

U.S. PATENT DOCUMENTS

2013/0254197 A1* 9/2013 Hay .................. H04L 43/028
                                                  707/736
2019/0031203 A1* 1/2019 Fox .................. B60W 50/02

OTHER PUBLICATIONS

IPO Search Report under Section 17(5) for Application No. GB 1808739.5, dated Nov. 14, 2018, 4 pages.
IPO Search Report under Section 17(5) for Application No. GB 1808737.9, dated Nov. 14, 2018, 4 pages.
Korn et al., "The VCDIFF Generic Differencing and Compression Data Format," Network Working Group, RFC 3284, Jun. 2002, 29 pages.

* cited by examiner

US 11,237,820 B2

DELTA FILE WITH REVERSING DATA

CROSS REFERENCE TO RELATED APPLICATIONS

This is the U.S. National Stage of International Application No. PCT/EP2019/063882, filed May 28, 2019, which was published in English under PCT Article 21(2), which in turn claims the benefit of Great Britain Application No. 1808739.5, filed May 29, 2018, and Great Britain Application No. 1808737.9, filed May 29, 2018.

BACKGROUND OF THE INVENTION

This invention relates to methods, apparatus and software for updating a data file on a device.

When updating software, or other data file, on a device, one option is to send a complete replacement data file to the device, to replace the data file currently stored on the device. Such an approach is described in the applicant's earlier application WO 2015/092355. However, this can require sending a large amount of data to the device, which may be undesirable, especially if the update is received over a wireless connection, such as a radio link. Transmitting a large amount of data by radio can be time-consuming and can also present a higher risk of transmission errors.

An alternative approach is not to send the entire replacement data file but to use data differencing to generate a delta file that is sent to the device. This delta file (also referred to as a difference file or diff file) communicates the differences between the existing (source) data file and the new (target) data file. Typically, there will be regions of the new data file that are unchanged from the existing data file. A delta file does not need to communicate the data contained in such regions, so can be significantly smaller than the new data file itself.

On receiving such a delta file, a device can create the new data file in its memory by processing (interpreting) a set of delta instructions that are encoded in the delta file and applying these instructions to the existing data file. In some cases, the update can be applied in place, at least partly overwriting the existing data file. In this way the update process does not require the device to reserve an amount of memory equal to the size of the new data file, for performing the update, in addition to the memory occupied by the existing data file. Requiring less memory for the update process means the device may be able to be manufactured more cheaply. This is especially true of memory-constrained devices such as system-on-chip devices.

Sometimes an issue may be identified with the new data file that makes it desirable to reinstate the old data file. For example, when the data file is a firmware module for the device, it may be determined, after updating the firmware, that the new firmware contains a bug that means it does not operate correctly on the device. In this case, it may be necessary to revert to the old firmware.

A shortcoming with overwriting the old data file with the new data file is that rolling back to the old data file requires further, time-consuming data transfers, in order to restore the old data file to the device.

The present invention seeks to provide a better approach to updating data files (including software modules) on an electronic device.

SUMMARY OF THE INVENTION

From a first aspect, the invention provides a delta file comprising instructions which, when executed by a processing system to which the delta file is transferred, cause the processing system to generate a binary target file from a binary source file, wherein the delta file comprises:
one or more copy instructions that instruct the processing system to include one or more binary copy strings from the binary source file in the binary target file; and
reversing data for regenerating all of the binary source file that is outside the one or more binary copy strings.

From a second aspect, the invention provides a method of reversibly generating a binary target file from a binary source file, using a delta file, the method comprising:
receiving a delta file; and
processing instructions in the delta file to generate the binary target file from the binary source file,
wherein the delta file comprises:
one or more copy instructions identifying one or more binary copy strings in the binary source file; and
reversing data for regenerating all of the binary source file that is outside the one or more binary copy strings,
wherein the reversing data is received as part of the delta file, and
wherein generating the binary target file comprises:
reading the one or more binary copy strings from the binary source file and including the one or more binary copy strings in the binary target file.

The method may further comprise creating a regenerated binary source file, identical to the binary source file, from the binary target file by:
reading the one or more binary copy strings from the binary target file and including the one or more binary copy strings in the regenerated binary source file; and
using the reversing data to include, in the regenerated binary source file, all of the binary data of the binary source file that is outside the one or more binary copy strings.

From a third aspect, the invention provides a processing system for processing instructions in a delta file, received at an input of the processing system, to generate a binary target file from a binary source file, and for processing the instructions in the delta file to regenerate the binary source file from the binary target file, wherein the delta file comprises:
one or more copy instructions that instruct the processing system to include one or more binary copy strings from the binary source file in the binary target file; and
reversing data for regenerating for regenerating all of the binary source file that is outside the one or more binary copy strings,
wherein the reversing data is received as part of the delta file; and
wherein the processing system is configured to process the delta file to generate the binary target file from the binary source file by:
reading the one or more binary copy strings from the binary source file and including the one or more binary copy strings in the binary target file, and
wherein the processing system is configured to process the delta file to create a regenerated binary source file, identical to the binary source file, from the binary target file by:
reading the one or more binary copy strings from the binary target file and including the one or more binary copy strings in the regenerated binary source file; and
using the reversing data to include, in the regenerated binary source file, all of the binary data of the binary source file that is outside the one or more binary copy strings.

Thus it will be seen that, in accordance with these aspects of the invention, a delta file contains reversing data, which is not required for generating the target file from the source file, but which allows the same delta file to be used to regenerate the source file from the target file, if required. The copy instructions will not typically contain (e.g., encode) any of the contents of the source file or target file in the actual instructions, but will instead identify the binary strings in the source file—e.g., using address and/or length information. Thus, the delta file may still be smaller than the source file and smaller than the target file, even though it includes the reversing data, since the reversing data will typically represent only a fraction of the source file. (This assumes there is a typical level of overlap between the content of the two files; if there no overlap, e.g., if both files are fully encrypted and appear to be random noise, a delta update method would not be appropriate.)

A conventional delta file, such as is described in RFC 3284, does not support regenerating a source file from a target file, once the source file has been overwritten. This is because the sections of the source file that are not copied to the target file by a conventional delta file will be lost and cannot be recovered from the delta file and the target file.

The reversing data may encode the value of every bit position of the binary source file that lies outside the bit positions whose values are contained in the one or more binary copy strings. The reversing data may encode data from the source file directly—e.g., by comprising copies of one or more binary strings—or it may encode the binary data in any other way, such as using lossless compression.

In some embodiments, the reversing data alone may be used to regenerate all of the binary source file that is outside the one or more binary copy strings—e.g., if all the data outside the binary copy strings is directly included in the delta file. Note that each copy instruction is inherently reversible, simply by reading the corresponding binary copy strings from the binary target file and including it in the regenerated binary source file, in a reverse-copy operation.

In other embodiments, the reversing data and the binary target file may be used together to regenerate all of the binary source file that is outside the one or more binary copy strings. For example, the reversing data may comprise one or more instructions for generating some or all of the binary data of the binary source file from data in the binary target file. Such an instruction could include an XOR instruction, having an associated operand, encoded in the delta file, for performing a bitwise XOR calculation on one or more bits of the target file, in order to regenerate data in the regenerated binary source file; this is explained in more detail below.

The delta file is preferably smaller than the binary source file (i.e., fewer bytes in size). The delta file is preferably smaller than the binary target file.

A copy instruction may instruct the processing system to copy a binary copy string from the binary source file to the binary target file. This may comprise reading the binary copy string from a memory location within the binary source file and writing the binary copy string to a target memory location, which may be a memory location within the binary target file or which could be an intermediate or temporary memory location. One copy instruction may comprise two or more copy sub-instructions, each of which instructs the processing system to copy the binary copy string from a source address to a target address, such that the sequence together results in the binary copy string being read from the binary source file and included (e.g., written to) the binary target file. Each of the sub-instructions may be a copy instruction as disclosed herein. In other words, two or more copy instructions may be regarded as a single copy instruction, when they act on the same binary copy string—e.g., moving it to a temporary location before writing it to a final destination.

The binary target file and the binary source file may have at least one memory address in common, such that the target file at least partly overwrites the source file.

The processing system may be part of, or may be, an electronic device, such as an integrated-circuit device, or any other device. The processing system or device may comprise an input for receiving the delta file. The input may be a wired or wireless interface. Embodiments of the invention are particularly well suited to use on a device having a radio interface, especially a low-bandwidth radio interface, such as an LTE-M or NB-IoT radio, where a compact, yet reversible, delta file is particularly beneficial because of the relatively short time taken to receive the delta file over the radio interface.

The source file and target file may be non-executable data files, but, in a preferred set of embodiments, they are software files, such as firmware modules—i.e., comprising software code. They may be libraries or executable files. They may comprise software instructions for execution by the processing system. The reversibility provided by the delta file is especially useful when performing a firmware upgrade or patch, because a faulty target file may render the device inoperative. In particular, it may render the device unable to control a communication interface, such as a radio peripheral, in order to receive a second delta file or a replacement firmware. However, the reversibility of the present delta files mitigates this risk by enabling the firmware to be rolled back to the previously source-file version without requiring the reception of further data by the device. The updating of a source firmware file to a target firmware file may be controlled by boot loader software. The boot loader software may comprise instructions for testing the binary target file, generated from the binary source file. The boot loader software may comprise instructions for regenerating the binary source file in response to detecting an error in the binary target file.

In some embodiments, the delta file may comprise a sequence of instructions, which the processing system may execute in sequence.

The processing system may comprise a target address counter for storing a current location (e.g., in the target file) at which to apply a current instructions from the delta file. It may increment the target address counter by an appropriate amount after processing each instruction. In some embodiments, the processing system may comprise a source address counter for determining a current location (e.g., in the source file) at which to apply a current instructions from the delta file. It may increment the source address counter by an appropriate amount after processing each instruction. If the processing system uses both a source address counter and a target address counter, it may not be necessary for the copy instructions to contain any explicit source or target address data.

Alternatively, instructions in the delta file may comprise (i.e., encode) a source address and/or a target address. In particular, each copy instruction may include a source-address operand and a target-address operand. It may also include a length operand, indicating the amount of data to be copied from the source address to the target address. Some copy instructions may instruct the processing system to copy data directly from the source file to the target file. However, as already noted, some copy instructions (e.g., sub-instructions) may instruct the processing system to copy data to a temporary location, which is not the intended final location of the data in the target file, or to copy data from such a temporary location to the target file.

Address values may be hardware memory-address values, or they may be indexes or offsets into the source file or into the target file—e.g., specifying a byte or word offset from the start of the respective file.

The reversing data may comprise address information representing locations of the binary strings in the source file and/or in the target file (or one or more temporary locations). The address information may comprise address values, such as bit, byte or word offsets into the file. Alternatively, the address information may be encoded through the position or positions of the reversing data within the delta file, which may correspond to respective source and/or target address values when the delta file is processed to regenerate the source file. In this case, the counter step sizes of other instructions in the delta file may also contribute to the encoding of the address information.

The delta file may comprise other delta instructions, for generating the binary target file, in addition to copy instructions. The delta file may comprise one or more add instructions, for generating the binary target file. Each add instruction may have associated binary add data. The add instruction may instruct the processing system to include the binary add data in the binary target file, when generating the target file from the source file. The delta file may comprise one or more run instructions, for generating the binary target file. Each run instruction may have an associated binary run value and a repeat value. The run instruction may instruct the processing system to include a number of copies of the binary run value in the binary target file, the number of copies equaling the repeat value. These add or run instructions may include explicit target address information; or they may include implicit target address information by virtue of the position of each instruction in the delta file, and the identities of the instructions that precede it in the delta file, as described above. When regenerating the source file from the target file, the add and/or run instructions may be ignored, or they may cause the processing system to increment a target address counter by an amount corresponding to the add data or the run length, but without including any binary data in the regenerated source file.

The reversing data may comprise one or more reverse-add instructions, also referred to herein as skip instructions. Each reverse-add instruction may have associated binary reverse-add (or skip) data, encoded in the delta file. The binary reverse-add data may equal some or all of the binary data of the source file that is outside the binary copy strings. The reverse-add instructions may be ignored when generating the target file from the source file. In embodiments that use a source address counter, they may cause the processing system to increment the source address counter but without including any additional data in the target file. However, when regenerating the source file from the target file, the reverse-add instructions may instruct the processing system to include the reverse-add data in the regenerated source file. The reverse-add instructions may be processed as add instructions when regenerating the source file. In some embodiments, the reverse-add instructions may include associated source addresses. In other embodiments, the processing system may use a source address counter, and the positions of the reverse-add instructions in the delta file may encode respective addresses in the source file at which to include the associated reverse-add data.

In some embodiments, the delta file may comprise one or more XOR instructions. Each XOR instruction may have an associated binary operand and may instruct the processing system, when generating the binary target file, to calculate the bitwise XOR of i) the associated binary operand and ii) a binary string from the binary source file or binary target file, and to include the result of the calculation, as a binary string, in the binary target file. The XOR instruction and its operand may be regarded as part of the reversing data, for reasons explained below.

As with the copy instructions, an XOR instruction may include a source address and a target address, or a source address but no target address, or a target address but no source address, or it may contain no explicit address data. The binary operand may inherently provide length information. Including both a source address and a target address in the XOR instruction may simplify the process of reversing an update, compared with using address counters to keep track of source and/or target locations.

The source address of an XOR instruction may be in the source file or in the target file (or in a temporary location). Similarly, the target address of an XOR instruction may be in the source file or in the target file (or in a temporary location). In some embodiments, at least one XOR instruction is applied to a binary string from the binary source file. The XOR instruction may include (i.e., encode) associated target address information, which may be an address in the target file. The address information could be an offset into the target file from the start of the target file, or it could be a relative offset, e.g., relative to the value of a target-file address counter at the time the XOR instruction is processed.

The inclusion of source and target address information with the XOR instructions enables the delta file to use a copy instruction, followed by one or more XOR instructions, in order to include a binary string in the target file that is similar, but not identical, to a binary string in the source file. In memory types that allow bits to be freely overwritten, such as SRAM, the processing system may execute such a sequence of instructions by first copying the original binary string from the source address to the target address, and then using the one or more XOR instructions to flip one or more bits at predetermined positions within the copied binary string, based on the xor data operands in the XOR instructions. In memory types that do not support arbitrary overwriting of data, such as flash memory (where a 1 bit can be changed to a 0 bit, but not vice versa without erasing an entire flash block), the processing system may process a copy instruction which is followed by one or more XOR instructions that act on the copied data by applying the XOR instructions to the data as it is being copied—i.e., after reading one or more bytes from the source data but before these bytes have been written to the target address specified by the copy instruction. In some embodiments, the processing system may be configured to identify when the delta file contains such a sequence of instructions and not process the copy without also applying the associated XOR instructions. Alternatively, the processing system may support COPY instructions that contain optional additional XOR operands which instruct the processing system to perform one or more bitwise XOR operations on respective strings within the data that is to be copied. The delta file may include one or more such COPY-with-XOR instructions.

Without an XOR instruction, creating a binary string in the target file that is similar, but not identical, to a binary string in the source file would require a delta file to contain two or more copy instructions and one or more add instructions. Thus, combined copy and XOR operations can be used reduce the number of copy instructions in the delta file, resulting in a smaller delta file.

This reduction in delta-file size may be particularly noticeable when the target file has a high degree of similarity to the source file overall, but with a large number of small differences spread across the file, because it enables the delta file to use far fewer copy instructions, acting on longer strings of data. The applicant has identified that the use of an XOR instruction (either standalone, or as an extension to a COPY instruction) is especially beneficial when applying data differencing to two versions of software code that have been compiled and linked for a processor that uses PC-relative (program-counter-relative) instruction addresses, such as Arm™ processors. This is because recompiling the software is likely to result in changes to every subroutine call and branch address. When using PC-relative addressing, the relative offset encoded in an opcode changes if the opcode is copied to a new location, even though the opcode target address is unchanged; by contrast, when using absolute addressing, the absolute target address remains the same when the opcode is copied to a new location. Thus, in some embodiments, the source file and the target file are respective software files for execution by a processor that uses PC-relative addressing.

Note that, for the purposes of understanding the scope of the present invention, a combination of one COPY instruction with one or more XOR instructions that change runs of bits within the copied data (either as they are written or after they have been written), can be seen as providing a plurality of separate copy instructions (each of which instructs the processing system to include a respective binary copy string from the binary source file in the binary target file, lying outside the runs of XOR bits), alongside reversing data. In other words, the binary copy strings may be regarded as those portions of the data from the source file that included in the target file without being XOR'd.

The use of an XOR instruction in a delta file is believed to be novel in its own right.

Thus, from a further aspect, the invention provides a delta file comprising instructions which, when executed by a processing system, cause the processing system to generate a binary target file from a binary source file, wherein the delta file comprises:
  a copy instruction that instructs the processing system to include a binary string from the binary source file in the binary target file; and
  an XOR instruction and an associated binary operand, wherein the XOR instruction instructs the processing system to calculate the bitwise XOR of the associated binary operand and a binary string from the binary source file or the binary target file, and to include said bitwise XOR as a binary string in the binary target file.

From another aspect, the invention provides a processing system for processing instructions in a delta file to generate a binary target file from a binary source file, wherein the delta file comprises:
  a copy instruction identifying a binary copy string in the binary source file; and
  an XOR instruction and an associated binary operand, and wherein the processing system is configured to:
  process the copy instruction by reading the binary copy string from the binary source file and including the binary copy string in the binary target file; and
  process the XOR instruction by calculating the bitwise XOR of the associated binary operand and a binary input string from the binary source file or the binary target file, and by including said bitwise XOR as a binary output string in the binary target file.

From another aspect, the invention provides a method of generating a binary target file from a binary source file, the method comprising:
  receiving a delta file;
  processing instructions in the delta file to generate a binary target file from a binary source file,
wherein the delta file comprises:
  a copy instruction identifying a binary copy string in the binary source file; and
  an XOR instruction and an associated binary operand, and wherein generating the binary target file comprises:
  processing the copy instruction by reading the binary copy string from the binary source file and including the binary copy string in the binary target file; and
  processing the XOR instruction by calculating the bitwise XOR of said binary operand and a binary input string from the binary source file or the binary target file, and including said bitwise XOR as a binary output string in the binary target file.

Features of these aspects may be combined with features of the earlier aspects or of any other embodiments disclosed herein. In particular, the delta file may comprise reversing data as described above. The delta file may comprise a plurality of copy instructions identifying respective binary copy strings in the binary source file. It may comprise a plurality of such XOR instructions.

A further benefit of the use of the XOR instruction in a delta file arises when the delta file is reversible, in that the XOR instruction can be reversed simply by applying the same XOR instruction to the binary string in the target file that was included as a result of the XOR instruction, when the target file was generated. This benefit is present even when the XOR instruction does not include associated source address information.

If it becomes desirable to regenerate the source file from the target file and the delta file (e.g., because the source file has been overwritten by the target file during the generating process), the processing system may reverse the XOR instruction by calculating a further bitwise XOR between the same associated operand and the relevant binary string from the target file (i.e., the binary string that was included in the target file as a result of the initial processing of the XOR instruction). This further bitwise XOR will be the original binary string, which can be included in the regenerated source file (either directly, or through a subsequent reversed copy instruction). The original source address of the XOR instruction can be used as a target address, and the original target address can be used as a source address, when reversing the XOR operation to regenerate the source file.

The inclusion of XOR instructions in a delta file does not therefore require the delta file to be made any larger in order to support the ability to regenerate the original source file from the target file.

In embodiments in which the XOR instruction originally had a source address in the binary source file, this reverse application of the same XOR instruction will calculate the original source-file binary string, which may be included in the regenerated binary source file.

In embodiments in which the XOR instruction originally had source and target addresses that are both in the binary target file (e.g., for performing an in-place XOR-after-copy operation), this reverse application of the same XOR instruction will calculate the original XOR-input string. This string may be written back to the target file (e.g., overwriting current data). It may then be included in a reverse-copy operation which copies the XOR-input string, along with other data, to the regenerated binary source file.

In any of the embodiments disclosed herein, the delta file may be regarded as software, or as a computer program—i.e., program instructions for the processing system. Aspects of the invention therefore extend to transient and non-transient computer readable media containing delta files as disclosed herein.

The processing system may consist of hardware only, or it may comprise both hardware and software. In some embodiments, the processing system may comprise dedicated hardware logic for processing the delta file. In other embodiments, the delta file is processed using interpreter software. The interpreter software may be, executed on a general-purpose processor, such as an Arm™ Cortex™-M series processor. The interpreter software comprises processor instructions for parsing, or interpreting, delta instructions in the delta file, and for applying the delta instructions to the source file to generate the target file and/or for applying the delta instructions to the target file to regenerate the source file. The interpreter software may be part of the processing system. It may be stored in a memory of the processing system or device. It may be contained in boot-loader software. Alternatively, the interpreter software may be included in the delta file, such that the delta file is self-interpreting. In other embodiments, the delta file may be directly executable by a general-purpose processor—i.e., comprising processor instructions for implementing the copy, XOR and/or other delta instructions.

In some embodiments, the delta instructions are encoded so that the most frequently used instruction is the shortest. The delta file may be stored or communicated in any appropriate way. It may be a single file or data block, or it may be split into multiple sub-files, or it may be a stream of instructions.

The processing system, or a device containing the processing system, may comprise a memory for storing the delta file and/or for storing the source file and/or for storing the target file. The memory may comprise volatile and/or non-volatile memory regions. The processing system is preferably configured to overwrite at least part of the source file when generating the target file. This reduces the memory requirements of the updating process, which may reduce the amount of memory required in the device overall, especially when, as in preferred embodiments, the device is a resource-constrained device such as integrated-circuit device. In some embodiments, the device may even contain less non-volatile memory in total than the sum of the sizes of the source file and the target file.

The processing system may "include" a binary string in a generated file by writing the binary string to an appropriate location in memory, which may be a non-volatile memory. Alternatively, a binary string may be included by outputting the binary string over an output, such as communication port; this may occur if the generated file (e.g., the binary target file) is generated on-the-fly by a communication device, rather than the processing system writing the target file, in its entirety, to a memory.

If, unusually, a COPY instructions specifies a target location for a copy string that is identical to the source location of the string (i.e., the very same memory address), then processing the COPY instruction to include the copy string in the target file may involve the processing system taking no action in response to this instruction (because the data is already in the required location).

The delta instructions may all operate on one or more units of data having a constant minimum size. Each delta instruction may operate on data that is an integer multiple of a constant unit size. In some embodiments, this unit may be 8 bits, as in RFC 3284, but in other embodiments it may be smaller or larger. In one preferred set of embodiments, the basic unit of data is 16 bits. This allows the delta file efficiently to represent differences between two files containing Arm™ Thumb2 code, which mainly contain 16-bit instructions.

The delta file may be generated in any suitable way. It will typically be created once (e.g., by a software developer) and sent to a plurality (potentially thousands) of individual processing systems as disclosed herein. In some embodiments, the delta file may be generated using conventional software tools, such as a Unix diff utility, in addition to one or more custom scripts for generating instructions such as copy instructions, add instructions, reverse-add (skip) instructions, and XOR instructions.

From a further aspect, the invention provides a delta file comprising instructions which, when executed by a processing system, cause the processing system to generate a binary target file from a binary source file, wherein the delta file comprises:
  one or more copy instructions that instruct the processing system to include one or more binary copy strings from the binary source file in the binary target file; and
  reversing data for regenerating all of the binary source file that is outside the one or more binary copy strings.

From another aspect, the invention provides a method of reversibly generating a binary target file from a binary source file, using a delta file, the method comprising:
  processing instructions in the delta file to generate the binary target file from the binary source file,
wherein the delta file comprises:
  one or more copy instructions identifying one or more binary copy strings in the binary source file; and
  reversing data for regenerating all of the binary source file that is outside the one or more binary copy strings, and
wherein generating the binary target file comprises:
  reading the one or more binary copy strings from the binary source file and including the one or more binary copy strings in the binary target file.

From another aspect, the invention provides a processing system for processing instructions in a delta file to generate a binary target file from a binary source file, and for processing the instructions in the delta file to regenerate the binary source file from the binary target file,
wherein the delta file comprises:
  one or more copy instructions that instruct the processing system to include one or more binary copy strings from the binary source file in the binary target file; and
  reversing data for regenerating for regenerating all of the binary source file that is outside the one or more binary copy strings,
wherein the processing system is configured to process the delta file to generate the binary target file from the binary source file by:
  reading the one or more binary copy strings from the binary source file and including the one or more binary copy strings in the binary target file, and
wherein the processing system is configured to process the delta file to create a regenerated binary source file, identical to the binary source file, from the binary target file by:
  reading the one or more binary copy strings from the binary target file and including the one or more binary copy strings in the regenerated binary source file; and
  using the reversing data to include, in the regenerated binary source file, all of the binary data of the binary source file that is outside the one or more binary copy strings.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
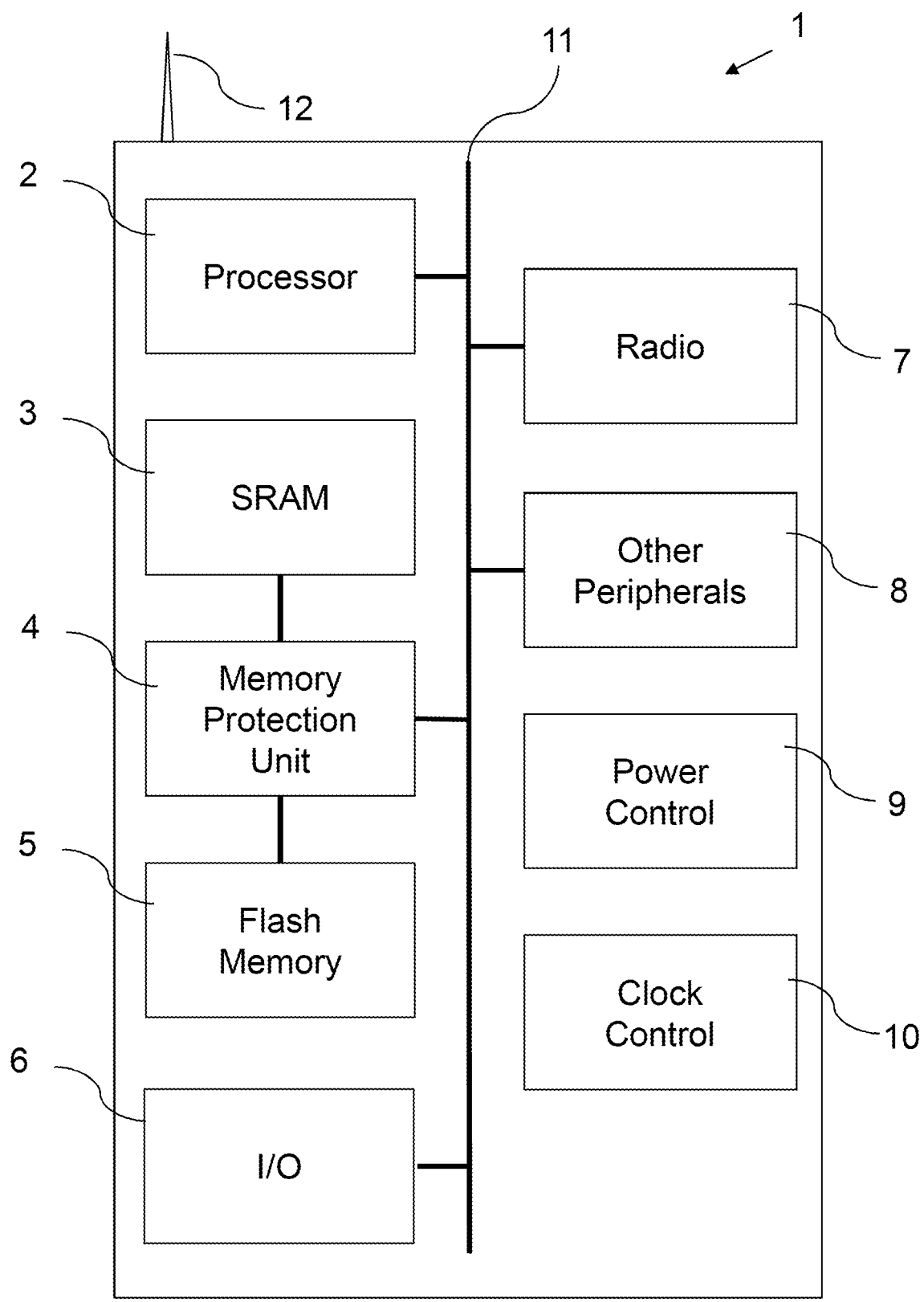
FIG. 1 is a schematic drawing of a radio-on-a-chip device embodying the invention.

FIG. 1 shows an integrated-circuit system-on-chip device 1 which includes a radio, and may therefore also be called a radio-on-a-chip. It may be incorporated into an electronic product such as a wireless heart-rate monitor, or a room temperature sensor, or another Internet-of-Things device.

The device 1 comprises a processor 2 (e.g. an ARM™ Cortex™-M series processor), SRAM 3, a hardware memory protection unit 4, non-volatile flash memory 5, input/output peripherals 6, a radio 7 (which may include a further processor), other peripherals 8 (which could include cryptoprocessors, ADCs, DACs, timers, etc.), power management circuitry 9 and clock management circuitry 10. On-chip communication is provided by a bus system 11—e.g., an ARM™ AMBA bus system, which may include one or more Advanced High-Performance Buses (AHB's) and/or Advanced Peripheral Buses (APB's).

The device 1 may include other analogue or digital components as appropriate. When installed in a product, the device 1 may be connected to external components such as a power supply, radio antenna 12, crystal oscillator, capacitors, sensors, audio/visual output devices, etc.

Figure 2:
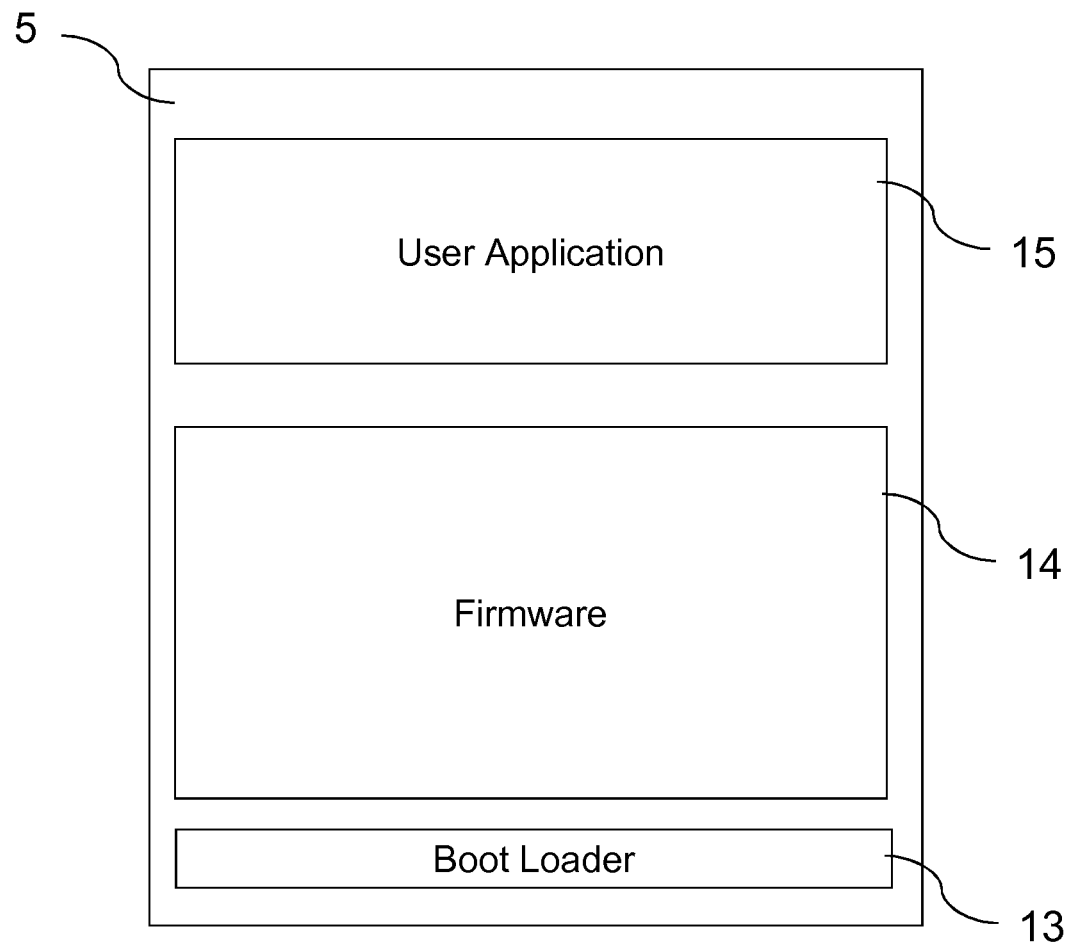
FIG. 2 is a schematic drawing showing the main software components stored in flash memory of the device.

FIG. 2 shows the main software components stored in the flash memory 5, for execution by the processor 2. These include a boot loader 22, a firmware module 14, and an optional user application 15. The firmware module 14 is typically created by the device manufacturer, whereas the user application 15 may be created by a customer, such as a manufacturer of an electrical appliance in which the system-on-chip 1 is installed. The software may first be loaded onto the device at the semiconductor fabrication plant, or at later stage. Typically, the boot loader 22 and firmware module 14 will be installed before the device 1 is released to an end user. This initial loading may be done over an external wired interface, such as a debug port.

The firmware module 14 may include low-level code for controlling the radio 7 and other peripherals 8. It may include a real-time operating system. It can provide an application programming interface (API) to the user application 15 which allows the developer of the user application 15 to access the various functions of the device 1 easily.

The boot loader includes code that is executed every time the device 1 is reset. It performs boot tasks such as writing configuration data to volatile hardware registers, and verifying the integrity of the device 1 and the software. The updating of the firmware 14 is also carried out under the control of the boot loader 13.

Once the device 1 is in the field, it may be desirable to replace the existing firmware 14 with new firmware, in order to provide new features or to fix software bugs. For convenience, update data that encodes the new firmware is received by radio through the antenna 12 using the radio 7. It may be received over an LTE-M, NB-IoT or other 3G, 4G or 5G cellular connection, or over a WiFi™ or Bluetooth™ connection, or over any other appropriate radio protocol.

During the updating, the existing firmware 14 is overwritten by the new firmware. This avoids having to provide the SRAM 3 or flash 5 with sufficient capacity to store both the existing firmware 14 and the new firmware during the updating, which would add to the cost of the device 1.

The update data received by the radio 7 includes a delta file that encodes the new firmware as differences over the existing firmware 14.

The boot loader 13 contains instructions that cause the processor 2 to perform the update process. In one embodiment, the radio 7 stores the received delta file in a buffer in the SRAM 3. An interpreter algorithm within the boot loader 13 parses the buffered delta file, and applies the delta instructions it contains to the existing firmware 14, stored in the flash memory 5, to generate the new firmware. The new firmware may be written straight to the flash memory 5, or it may be buffered in the SRAM 3 before being written to the flash memory 5.

The overwriting of the existing firmware 14 with the new firmware may happen as the delta file representing the new firmware is still being received by the radio 7 (i.e., in real time). Alternatively, the entire delta file may be received into memory (e.g., flash 5) before the updating starts. While this may be slower and require more memory space than real-time updating, it allows the integrity of the received delta file to be checked before the patch is applied (e.g., by verifying a checksum or hash). Even when the entire delta file is buffered before being processed, less memory space is required to perform the updating than if the new firmware were received without using difference encoding; this is because data differencing should always create a delta file that is smaller than the target, since there will always be portions of data that are the same in the existing firmware 14 and new firmware. Typically, there will be significant overlap between the contents of the old firmware 14 and the contents of the new firmware.

Figure 3:
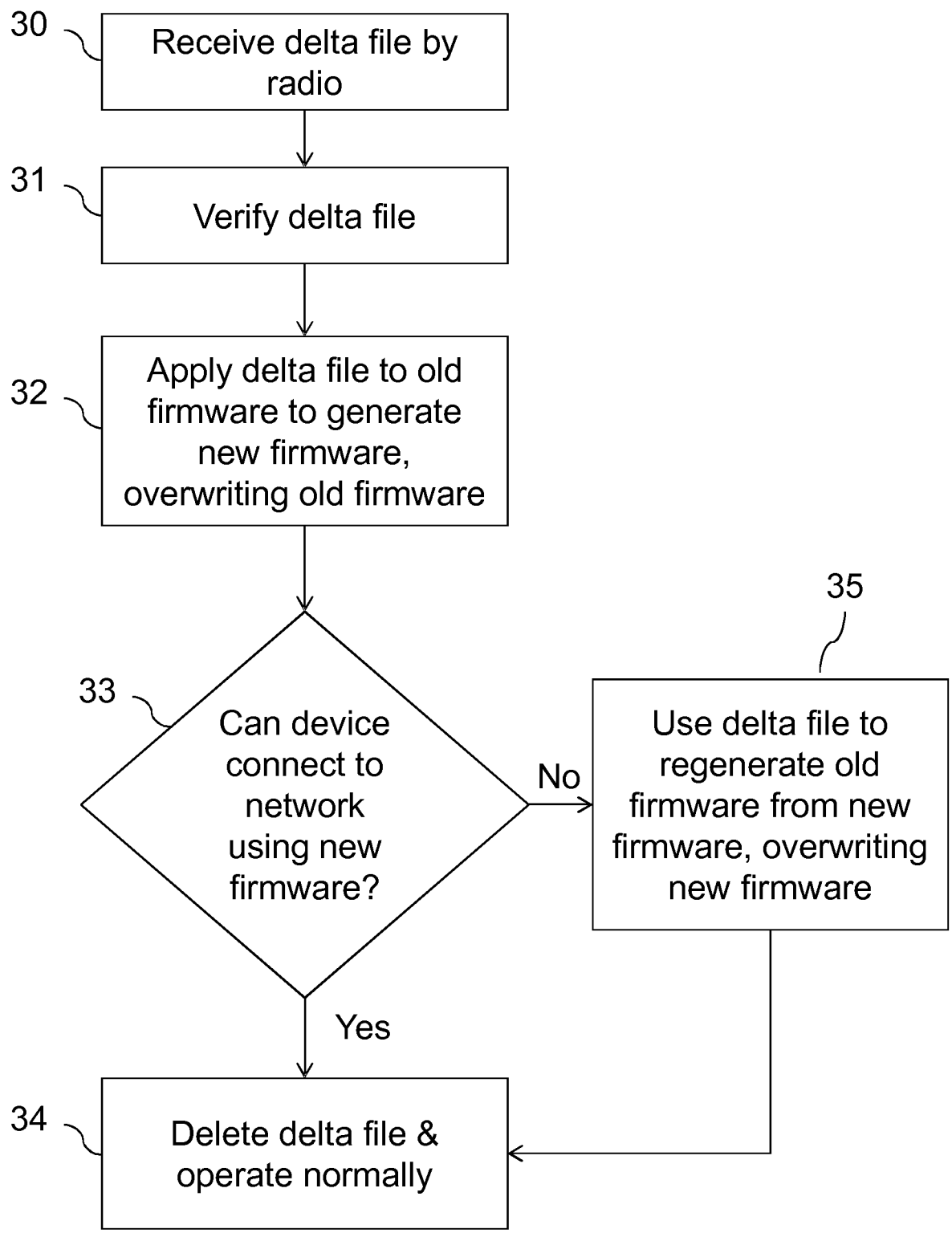
FIG. 3 is a flow chart of a firmware update operation for the device.

FIG. 3 summarises the steps involved in updating the old firmware 14 with new firmware.

In a first step 30, the device 1 receives the delta file by radio. The whole delta file may be stored in flash 5. Alternatively, it could be stored SRAM 3, but storing in flash 5 may be beneficial if the device resets during the update process, since the delta file will be retained.

In a second step 31, control passes from the existing firmware 14 to the boot loader 22. The boot loader 22 verifies the delta file by checking a hash or checksum. If the delta file has not been correctly received, the device 1 may abort the update process and return control to the existing firmware 14. Retransmission may be requested from the network.

In a third step 32, the boot loader 22 parses the delta file and applies the delta instructions it contains to the old firmware 14, in order to generate the new firmware. As the new firmware is generated, the new firmware is written over some, or all, of the old firmware 14. This process is described in more detail below.

In a fourth step 33, the boot loader 22 instructs the new firmware to use the radio 7 to connect to the network, or to a paired device.

If the connection succeeds, the next step 34 may be to delete the delta file to free up more memory space (although it may be retained for longer if desired), after which normal operation resumes. This could involve transferring control to the new firmware or to a user application 15.

If the radio connection fails, it can be inferred that the new firmware is not operating correctly and the device 1 needs to be rolled back to the old firmware. In this case, the next step 35 involves the boot loader 22 parsing the delta file a second time, but interpreting it somewhat differently (as described below), in order to transform the new firmware into the old firmware 14. The regenerated old firmware 14 is written over the new firmware (at least partially). After the old firmware 14 has been restored, a final step 34 of deleting the delta file and resuming routine operation may be performed.

The device 1 can inform the network, or paired device, of the error so that appropriate action can be taken (e.g., reporting a problem with the new firmware to the firmware developer).

The interpreter algorithm in the boot loader 22 operates as follows.

The received delta file includes the following delta instruction types: COPY, ADD, SKIP and XOR. These may be encoded in any convenient way—e.g., as ASCII text or as binary codes. In some embodiments, the delta file may also include a RUN instruction, which is effectively an efficient type of ADD instruction for adding a repeated data word.

A COPY instruction includes the following operands: source address, target address, length. An ADD instruction includes the following operands: target address, data. A SKIP instruction includes the following operands: source address, data (provided for use in a reverse operation, where the SKIP is implemented as an ADD). An XOR instruction includes the following operands: source address, target address, xor-data. Where data is supplied as an operand, the data itself implicitly provides a length value—e.g., defining the number of bytes to be skipped in a SKIP operation. In some embodiments, the COPY instruction may support optional XOR operands, which, when provided, cause the processor to perform a combined COPY-with-XOR operation. Including explicit source and target addresses in the instructions, rather than using an incremental target address counter to keep track of the target address as the instructions are processed, can make it easier to process the delta file in reverse.

When generating the new (target) firmware from the existing (source) firmware, the interpreter algorithm processes the instructions in the delta file in sequence. It processes a COPY instruction by reading the indicated string of bytes from the source address in the old firmware 14 and writing them, unchanged, to the target address. The target address may be a memory address that will be part of the new firmware. However, in some cases, the target address can be a temporary location, with the same data being copied another one or more times before it is written to its final location in the new firmware. This can be useful for ensuring the update process is robust against power interruptions by maintaining a redundant copy of certain data as it is being updated.

When generating the new firmware, the update algorithm processes an ADD instruction by adding the indicated string of bytes to the target memory address. It ignores SKIP instructions (these are to be used when reversing an update). It processes an XOR instruction by reading the indicated string of bytes from the source memory address, calculating a bitwise XOR between the string of bytes and the xor-data operand encoded in the instruction, and writing the resulting string of bytes to the target address. As with the COPY instruction, the target addresses of these further instructions may be temporary locations or final locations within the new firmware.

If becomes necessary to regenerate the old firmware 14 from the new firmware, the interpreter algorithm parses the delta file a second time. It processes each COPY instruction by reading the indicated string of bytes from the original target address and writing them, unchanged, to the original source address. It ignores each ADD instruction (i.e., treating it as a SKIP instruction). It processes each SKIP instruction by adding the indicated string of bytes to the indicated source address (i.e., it treats it as an ADD instruction). It processes an XOR instruction by reading the indicated string of bytes from the original target address, calculating a bitwise XOR between the string of bytes and the xor-data operand encoded in the instruction, and writing the resulting string of bytes to the original source address.

A simplified example is now provided to illustrate these principles. It shows one way in which a reversible delta file, containing XOR instructions, can be generated. Of course, in practice, the source and target files may be much more complex than this, and other processes for generating a suitable delta file may be used.

Assume the source file is called 'oldversion' and the target file is called 'newversion':
$ cat oldversion
abcdefghijklmnop
$ cat newversion
abcdij1234567klmnop First, the files are converted to hex dumps, with one 16-bit value on each side:
$ od -t x2-A none -v -w2 oldversion>oldversion.vhx16
$
$ od -t x2-A none -v -w2 newversion>newversion.vhx16
The 16-bit hex dumps are now as follows:
$ cat oldversion.vhx16
6261
6463
6665
6867
6a69
6c6b
6e6d
706f
$ cat newversion.vhx16
6261
6463
6a69
3231
3433
3635
6b37
6d6c
6f 6e
0a70
Comparing the files side by side results in the following:

$ diff --side-by-side oldversion.vhx16 newversion.vhx16
1. 6261                6261
2. 6463                6463
3. 6665                <
4. 6867                <
5. 6a69                6a69
6. 6c6b                | 3231
7. 6e6d                | 3433

-continued

| | | |
|---|---|---|
| 8. 706f | \| | 3635 |
| 9. | > 6b37 | |
| 10. | > 6d6c | |
| 11. | > 6f6e | |
| 12. | > 0a70 | |

Insertions are marked with '<'. Deletions are marked with '<'. Data that is different is marked with '|'. Data that is identical in both versions is the same in both columns.

A script is used to parse the two-column difference table and to generate the following sequence of instructions:

```
COPY (source: 00000000, target: 00000000, length: 2 shorts)    [lines 1 ... 2]
SKIP (source: 00000004, data: 6665 6867)                        [lines 3 ... 4]
COPY (source: 00000008, target: 00000004, length: 4 shorts)    [lines 5 ... 8]
XORH (source: 0000000A, target: 00000006, xor-data: 5E5A)      [line 6]
XORH (source: 0000000C, target: 00000008, xor-data: 5A5E)      [line 7]
XORH (source: 0000000E, target: 0000000A, xor-data: 465A)      [line 8]
ADD (target: 0000000C, data: 6b37 6d6c 6f6e 0a70)              [lines 9 ... 12]
```

The 'source' address values are byte counts into the 'oldversion' file, while the 'target' addresses are byte counts into the 'newversion' file.

These instructions, and the indicated operands, can be encoded in any suitable way to form the delta file Although the COPY instruction is shown here as acting on four shorts, in other implementations a COPY instruction could copy just one short (6a69), with the following three XOR instructions being executed as copy-and-XOR operations.

In order to process the delta file in reverse (i.e. to regenerate the 'oldversion' file from the 'newversion' file), the interpreter processes the instructions in the same order, but swaps the 'source' and 'target' values over in each COPY instruction, and in each XOR instruction; it also processes each SKIP instruction as an ADD instruction having a target address in the 'newversion' file that is equal to the source address in the original SKIP instruction, and similarly processes each ADD instruction as a SKIP instruction. In this way, the same delta file can be used for both upgrading and rolling back.

The instructions may be coded in the delta file so that most frequently used instructions are the shortest. In this simple example, it is possible to generate a delta file of 25 bytes.

In a larger example, such as updating a 1 MB LTE modem firmware image for an Arm™ Cortex™-M processor, a traditional VCDIFF compressed delta image size, without any rollback capability, might be 280 kB. Under the present COPY/XOR/ADD/SKIP scheme, a compressed and rollback-capable delta image size of 80 kB can be generated. This delta file is both smaller and reversible.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method of reversibly generating a binary target file from a binary source file, using a delta file, the method comprising:
   receiving a delta file; and
   processing instructions in the delta file to generate the binary target file from the binary source file,
   wherein the delta file comprises:
   one or more copy instructions identifying one or more binary copy strings in the binary source file;
   one or more skip instructions, each comprising a source-address operand; and
   reversing data for regenerating all of the binary source file that is outside the one or more binary copy strings,
   wherein the reversing data is received as part of the delta file, and
   wherein generating the binary target file comprises:
   reading the one or more binary copy strings from the binary source file and including the one or more binary copy strings in the binary target file.

2. The method of claim 1, further comprising creating a regenerated binary source file, identical to the binary source file, from the binary target file by:
   reading the one or more binary copy strings from the binary target file and including the one or more binary copy strings in the regenerated binary source file; and
   using the reversing data and the source-address operand of each of the one or more skip instructions to include, in the regenerated binary source file, all binary data of the binary source file that is outside the one or more binary copy strings.

3. The method of claim 2, comprising using the reversing data together with data from the binary target file to generate all of the binary source file that is outside the one or more binary copy strings.

4. The method of claim 1, wherein the reversing data encodes the respective value of every bit position in the binary source file that lies outside a set of bit positions whose values are contained in the one or more binary copy strings.

5. The method of claim 1, wherein the delta file is smaller than the binary source file and is smaller than the binary target file.

6. The method of claim 1, wherein the binary source file is stored in memory, and wherein generating the binary target file comprises writing the binary target file at least partly over the binary source file.

7. The method of claim 1, wherein the delta file comprises one or more further delta instructions which are not copy instructions.

8. The method of claim 1, wherein each of the one or more copy instructions includes a source-address operand and a target-address operand.

9. The method of claim 1, wherein the reversing data comprises one or more reverse-add instructions, each having associated binary reverse-add data, wherein the binary reverse-add data is equal to some or all of the binary data source file that is outside the binary copy strings.

10. The method of claim 1, wherein the delta file comprises an XOR instruction, having an associated binary operand, and wherein generating the binary target file comprises calculating a bitwise XOR of i) the associated binary operand, and ii) a binary string from the binary source file or binary target file, and including said bitwise XOR, as a binary string, in the binary target file.

11. The method of claim 10, wherein the reversing data includes said XOR instruction, the method further comprising creating a regenerated binary source file, identical to the binary source file, from the binary target file, wherein said creating comprises calculating a bitwise XOR of i) the binary operand of the XOR instruction, and ii) said binary string from the binary target file, and including said bitwise XOR in the regenerated binary source file or in the binary target file.

12. The method of claim 1, wherein the binary source file and the binary target file are respective software files compiled for execution by a processor that uses PC-relative addressing.

13. A processing system for processing instructions in a delta file, received at an input of the processing system, to generate a binary target file from a binary source file, and for processing the instructions in the delta file to regenerate the binary source file from the binary target file,
wherein the delta file comprises:
one or more copy instructions that instruct the processing system to include one or more binary copy strings from the binary source file in the binary target file;
one or more skip instructions, each comprising a source address operand; and
reversing data for regenerating for regenerating all of the binary source file that is outside the one or more binary copy strings,
wherein the reversing data is received as part of the delta file; and
wherein the processing system comprises dedicated hardware logic for processing the delta file, or comprises a processor and a memory storing interpreter software for execution by the processor, whereby the processing system is configured to process the delta file to generate the binary target file from the binary source file by:
reading the one or more binary copy strings from the binary source file and including the one or more binary copy strings in the binary target file, and
wherein the processing system is configured to process the delta file to create a regenerated binary source file, identical to the binary source file, from the binary target file by:
reading the one or more binary copy strings from the binary target file and including the one or more binary copy strings in the regenerated binary source file; and
using the reversing data and the source-address operand of each of the one or more skip instructions to include, in the regenerated binary source file, all of the binary data of the binary source file that is outside the one or more binary copy strings.

14. The processing system of claim 13, wherein the delta file and the binary source file are stored in a memory of the processing system.

15. The processing system of claim 13, wherein the binary source file and the binary target file comprise software code for execution by the processing system.

16. The processing system of claim 13, wherein the processing system comprises a processor and interpreter software for interpreting the instructions in the delta file.

17. The processing system of claim 16, wherein the interpreter software is contained in boot-loader software stored in a memory of the processing system, and wherein the boot-loader software further comprises instructions for testing the binary target file, generated from the binary source file, and for using the delta file to regenerate the binary source file in response to detecting an error in the binary target file.

18. The processing system of claim 13, comprising a radio interface for receiving the delta file.

19. The processing system of claim 13, wherein the reversing data comprises one or more reverse-add instructions, each having associated binary reverse-add data, wherein the binary reverse-add data is equal to some or all of the binary data of the source file that is outside the binary copy strings.

20. A non-transitory computer-readable medium having stored thereon a delta file comprising instructions which, when executed by a processing system to which the delta file is transferred, cause the processing system to generate a binary target file from a binary source file, wherein the delta file comprises:
one or more copy instructions that instruct the processing system to include one or more binary copy strings from the binary source file in the binary target file;
one or more skip instructions, each comprising a source-address operand; and
reversing data for use with the source-address operand of each of the one or more skip instructions to regenerate all of the binary source file that is outside the one or more binary copy strings.

* * * * *